Oct. 18, 1966  R. M. DAKIN  3,279,171
GOVERNOR CONTROL FOR A FUEL SYSTEM OF A GAS TURBINE
POWER-PRODUCING PLANT
Filed Jan. 13, 1964
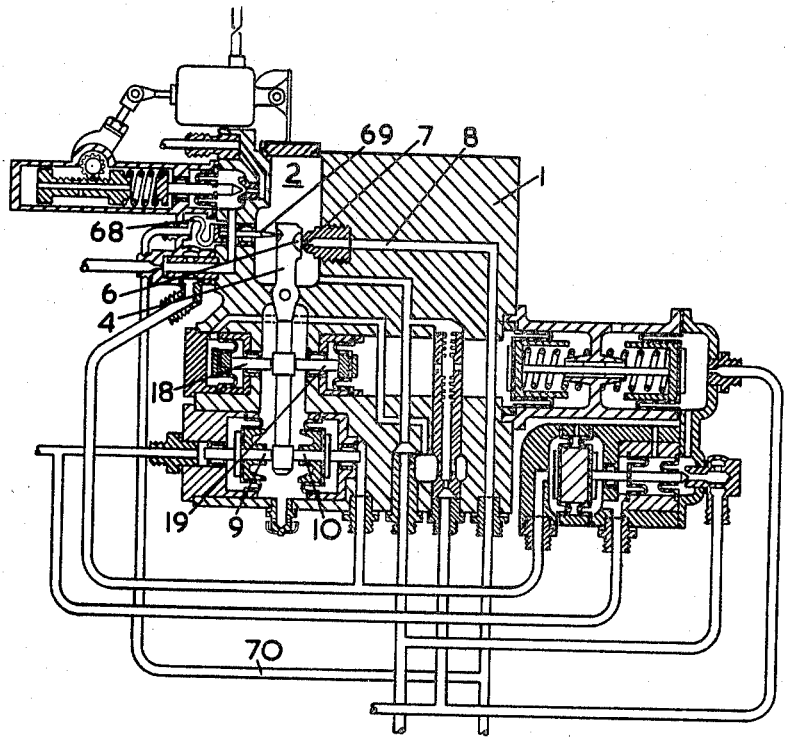
FIG.1.  FROM PUMP SERVO-PISTON
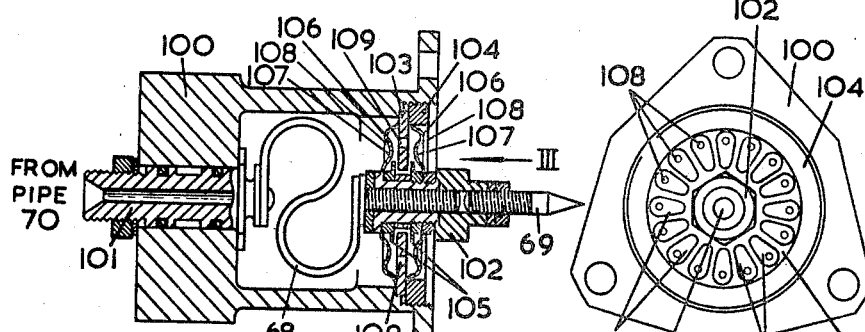 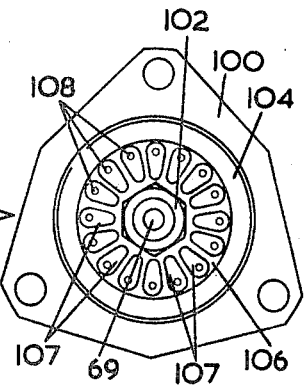
FIG.2.  FIG.3.

3,279,171
GOVERNOR CONTROL FOR A FUEL SYSTEM OF A GAS TURBINE POWER-PRODUCING PLANT
Robin M. Dakin, Coventry, England, assignor to Bristol Siddeley Engines Limited, Bristol, England
Filed Jan. 13, 1964, Ser. No. 337,252
Claims priority, application Great Britain, Jan. 17, 1963, 2,108/63
2 Claims. (Cl. 60—39.28)

The invention relates to a fluid servo system including a movable valve member controlling the flow of a servo fluid through an orifice and is particularly, but not exclusively concerned with a governor control, for a fuel system of a gas turbine power-producing plant, including a power turbine, the governor control being of the kind in which a valve member, e.g., a half-ball valve, is carried on a pivotally-mounted arm and is arranged to co-operate with an orifice through which a servo fluid is passed under the control of the valve member, thereby to control the fuel supply to the plant. When the power turbine is operating at its governed speed, the arm is maintained substantially in balance by opposed forces acting on the arm and produced respectively by means responsive to power turbine speed or other operating condition thereof and by spring means or a pressure signal determining a datum turbine speed or other datum parameter.

In addition to the control of servo fluid by the valve member, the servo fluid will exert a force on the latter leading to inaccuracy of governing. In a governor control of the aforesaid kind, the valve member usually controls the movement of a servo piston in the fuel pump and in that case, if the valve member opens, beyond an equilibrium position, due to a speed error, the pressure of the servo fluid will fall, as the servo piston will not immediately respond, due to friction opposing its movement. Thus the force due to fluid pressure acting on the valve member will fall, thereby the extent of its opening will be less than it would have been if there had been no friction acting on the servo piston. This means that a finite speed change is required to reduce or to increase the servo pressure sufficiently to overcome friction acting on the servo piston. Hence the sensitivity of governing is impaired.

For a fixed pump pressure, the varying servo fluid force acting on the valve member as it opens and closes constitutes, in effect, a spring of considerable stiffness. In other words, the force on the valve member due to the servo fluid imparts a rate effect to the pivotally-mounted arm. An object of the invention is to reduce or eliminate this rate effect.

According to the invention, a fluid servo system including a movable valve member controlling the flow of a servo fluid through an orifice also includes a substantially rateless device arranged to apply a force on the valve member in opposition to the force exerted thereon by the fluid pressure within the orifice, the force applied by the device being variable in response to variation in the fluid pressure within the orifice.

Conveniently the device includes a Bourdon type tube arranged to exert a variable force on the valve member and communicating with the interior of the orifice.

Where the Bourdon tube has inherent stiffness and thus a positive rate, the device may comprise the combination with the Bourdon tube of at least one de-rating diaphragm engaged by the movable end of the Bourdon tube, the diaphragm or diaphragms having a negative rate of such a value that the positive rate of the Bourdon tube is substantially cancelled thereby.

By way of example, a governor control for a fuel system of a gas turbine power-producing plant and incorporating a substantially rateless device in accordance with this invention will now be described with reference to the accompanying drawings, in which:

FIGURE 1 is a section through the governor control;
FIGURE 2 is a longitudinal section through the said device, which is also shown in FIGURE 1 to a considerably smaller scale, and
FIGURE 3 is a view in the direction of arrow III in FIGURE 2.

The governor control shown in FIGURE 1 has been described in our co-pending application No. 337,251, filed January 13, 1964, will not be described herein except for parts associated with the device, the subject of the present invention. Parts referred to herein which also appear in the drawing accompanying the specification of the aforesaid application are given the same reference numerals in the two specifications. The said device comprises a plunger 69 which bears against the pivotally-mounted arm 4 of the governor control at a position substantially opposite the half-ball valve 6, carried by the arm 4. The end of the plunger 69 remote from the arm 4 is movable from left to right or vice versa, as viewed in FIGURE 1 by a Bourdon type tube 68, which communicates with a pipe 70, branched from the pipe 8, leading from the servo piston of the fuel pump to the seat 7 of the half-ball valve 6. Thus as the half-ball valve moves and alters the pressure of the servo fluid acting on the servo piston of the pump, the pressure within the Bourdon tube 68 will also alter and will affect the force exerted on the arm 4 by the plunger 69, as will be hereinafter described.

Referring to FIGURES 2 and 3, the device comprises a tubular housing 100 shaped to fit in a wall defining the cavity 2 in the block 1 of the governor control shown in FIGURE 1. The housing 100 has a wall at one end thereof in which there is fitted a tubular pipe connection 101. The outer end of the connection 101 is externally screwed for engagement by the pipe 70, shown in FIGURE 1, and the inner end communicates with the Bourdon tube 68, which is positioned within the housing 100. The end of the Bourdon tube remote from the connection 101 is closed and is attached to a block 102, which supports the plunger 69. The block is movable axially of the housing 100 by expansion and contraction of the Bourdon tube 68 in response to change of pressure within the pipe 70. The end of the housing 100 adjacent the block 102 has an annular recess formed therein, in which there is located a ring 103, held in position by a screwed retaining ring 104 engaging an internal screw thread in the housing 100. The inner periphery of the ring 103 is positioned between a pair of axially-spaced annular ribs 105 on the block 102, the ribs 105 thereby limiting the axial movement of the block 102. A pair of springy metal diaphragms 106 having negative rate are attached at their outer peripheries to the ring 103 and at their inner peripheries to the block 102 and thus support the block 102 and the plunger 69 centrally of the housing 100. The diaphragms 106 are stiffened by a circular arrangement of dimples 107 formed thereon. Each dimple 107 has a small hole 108 formed therein and the ring 103 also has a circular arrangement of holes 109 formed therein, the holes 108 and 109 permitting the aforesaid axial movement of the block 102 without damping.

The Bourdon tube 68 has inherent stiffness and thus positive rate; but the diaphragms 106 having negative rate, i.e. rate acting in the opposite direction to that of the Bourdon tube, together substantially counteract the positive rate and so the force exerted by the plunger 69 on the arm 4 is solely due to the pressure in the pipe 70.

The effect of the device is that as the half-ball valve 6 moves from its equilibrium position, there is little or no change in the overall balance of forces acting on the arm 4. Thus a small speed error signal, applied by the combined effect of the governor force applied by plunger 9 and the opposing datum speed force applied by plunger 10 (see FIGURE 1), will cause a relatively large displacement of the half-ball valve 6. This in turn will cause a sufficient change in the servo fluid pressure in pipe 8 to overcome friction acting on the servo piston in the pump. The resulting change in pump pressure will then rebalance the pivotally-mounted arm 4 in response to the speed error signal by direct and delayed feed back plungers 18 and 19 respectively (see FIGURE 1), also arranged to act on the arm in opposition to each other.

The substantially rateless device according to this invention may be used in conjunction with the governor control arm disclosed in our co-pending application No. 313,291, filed October 2, 1963, in which other rate effects are reduced or eliminated. Thus the combination of the device according to this invention and the governor control arm of application No. 313,291 provides a governor control of extreme sensitivity.

As the force which can be exerted on the pivotally-mounted arm by the combined device, comprising the Bourdon tube and the de-rating diaphragm or diaphragms, may differ from the force exerted on the valve member by the fluid pressure at the seat, the combined device may be arranged to act on the arm at a position nearer to or further from the pivot of the arm than is the valve member, instead of substantially at the same distances from the pivot as in the aforegoing example.

What I claim as my invention and desire to secure by Letters Patent of the United States is:

1. A fluid servo system including an orifice through which the flow of servo fluid is to be controlled, a movable valve member controlling the flow of a servo fluid through said orifice, a Bourdon type tube positioned to exert a variable force on said valve member, the interior of said Bourdon tube communicating with the flow-path upstream of said orifice, thereby to apply a force on said valve member in opposition to the force exerted thereon by the fluid pressure in said flow-path, and at least one diaphragm engaged by the movable end of said Bourdon tube, said diaphragm having a rate opposed to that of said Bourdon tube, whereby the rate of the latter is substantially cancelled.

2. A governor control for a fuel system of a gas turbine power-producing plant, including a power turbine, the governor control including an orifice through which the flow of servo fluid is to be controlled, a pivotally-mounted arm, a valve member carried on said arm and co-operating with said orifice, thereby to control the fuel supply to the plant, a Bourdon type tube positioned to exert a variable force on said arm in opposition to the force exerted on said valve member, the interior of said Bourdon tube communicating with the flow-path upstream of said orifice, thereby to apply a force on said arm in opposition to the force exerted on said valve member by the fluid pressure in said flow-path, and at least one diaphragm engaged by the movable end of said Bourdon tube, said diaphragm having a rate opposed to that of said Bourdon tube, whereby the rate of the latter is substantially cancelled.

References Cited by the Examiner

UNITED STATES PATENTS 2,946,189 7/1960 Basford _____ 60—39.28

FOREIGN PATENTS 870,813 6/1961 Great Britain.

WILLIAM F. O'DEA, *Primary Examiner.*

CLARENCE R. GORDON, *Examiner.*